United States Patent [19]

Hoesman

[11] Patent Number: 4,734,232
[45] Date of Patent: Mar. 29, 1988

[54] METHOD FOR FABRICATING SOLID TIRE HAVING POLYURETHANE FOAM CORE

[76] Inventor: Bruce J. Hoesman, 30514 Rhine Dr., Ranchos Palos Verdes, Calif. 90274

[21] Appl. No.: 26,790

[22] Filed: Mar. 17, 1987

[51] Int. Cl.$^4$ .............................................. B29C 67/22
[52] U.S. Cl. .................... 264/46.6; 264/46.9; 425/812; 425/817 R
[58] Field of Search ................... 264/46.6, 46.5, 46.9; 425/DIG. 29, 817 R

[56] References Cited

U.S. PATENT DOCUMENTS

| | | | |
|---|---|---|---|
| 3,022,810 | 2/1962 | Lambe | 152/157 |
| 3,331,423 | 7/1967 | Guin | 152/313 |
| 3,605,848 | 9/1971 | Lombardi et al. | 152/310 |
| 3,676,028 | 7/1972 | Christie et al. | 425/38 |
| 3,794,706 | 2/1974 | Christie et al. | 264/45.1 |
| 3,854,516 | 12/1974 | Burnell | 152/415 |
| 3,872,201 | 3/1975 | Paul et al. | 264/55 |
| 4,060,578 | 11/1977 | Kisbany | 264/46.6 |
| 4,248,811 | 2/1981 | Doyle et al. | 264/46.6 |
| 4,416,844 | 11/1983 | Wyman | 264/267 |

FOREIGN PATENT DOCUMENTS 1106680  8/1984  U.S.S.R. .............. 264/46.6

Primary Examiner—Jan H. Silbaugh
Assistant Examiner—Allan R. Kuhns
Attorney, Agent, or Firm—Edward A. Sokolski

[57] ABSTRACT

A solid tire having a polyurethane foam core is fabricated by first mounting the tire on a two piece jig which simulates the wheel hub on which the tire is to be mounted. This jig is centered on the tire and tightened so that the inside surfaces of the two halves of the jig abut tightly against the tire body. A fill hole for filling the tire with foam is provided on one of the jig halves. A plurality of small holes are formed in the tire in a circle which runs along the high point of the outer surface of the tire, these vent holes being formed on the same side of the tire as the fill hole. The tire is then filled with a mixture of polyol and isocyanate through the fill hole to form a microcellular flexible polyurethane core within the tire. The core material is fed into the tire until the tire is filled a predetermined amount which with the expansion resulting from the chemical reaction, completely fills the tire as evidenced by material existing from the fill hole, at which time the fill hole is plugged. The jig is removed from the tire while the core material is still expanding to assure that such material is permitted to expand outwardly against the inner wall of the tire in tight abutment thereagainst and towards the center to assure a tight fit with the wheel hub on which it is subsequently installed.

13 Claims, 9 Drawing Figures

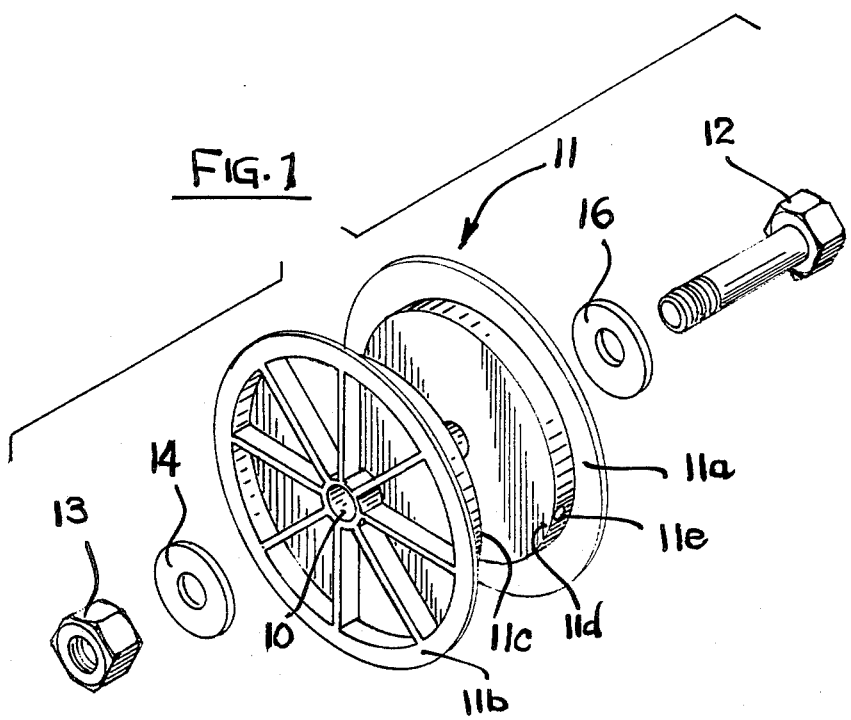
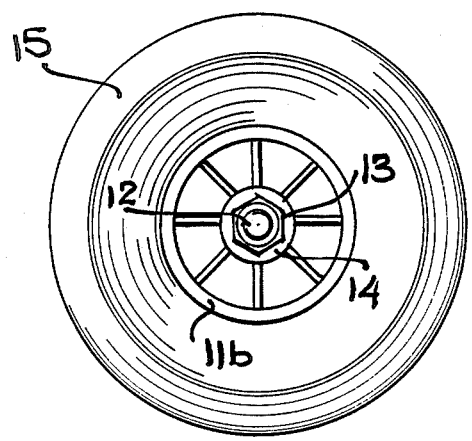
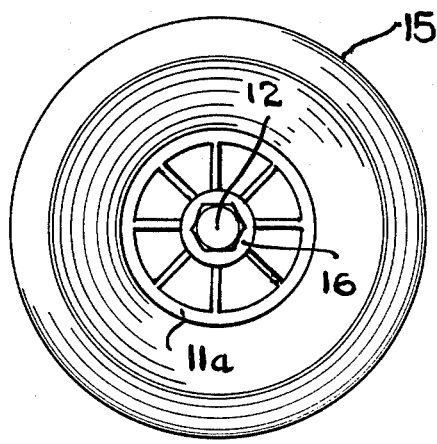
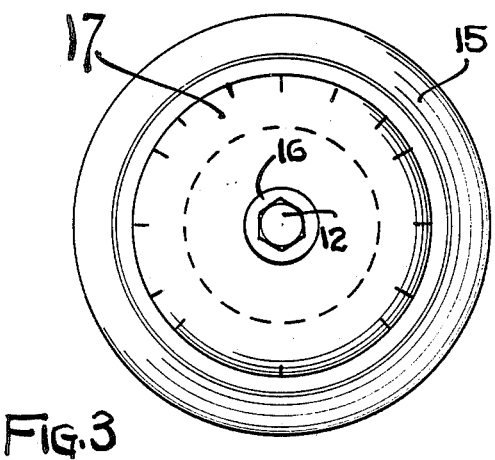
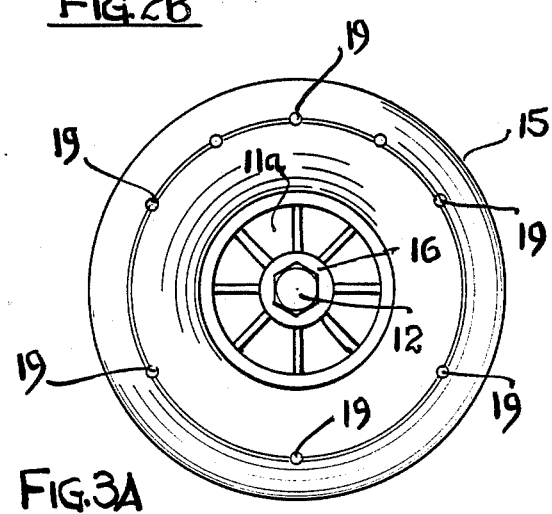

METHOD FOR FABRICATING SOLID TIRE HAVING POLYURETHANE FOAM CORE

This invention relates to solid tires having microcellular polyurethane foam cores and more particularly to a method for manufacturing such a tire with a jig which simulates the wheel hub on which the tire is to be mounted.

There is a need for tires which have airless cores fabricated of a suitable resilient material particularly for applications such as wheel chairs, wheelbarrows, golf carts, lawn mowers, hand trucks and bicycles or other applications where a pneumatic tire is inconvenient or impractical due to the need for filling such tires periodically and the susceptibility of such tires to going flat when punctured. Solid tires of elastomeric material have been used in such applications, but these tend to be overly heavy and hard in quality and do not generally provide the resiliency to be desired for smooth riding. To overcome this shortcoming of solid tires, tires utilizing the normal pneumatic tire casing which is filled with a polyurethane core material have been developed. Such tires and their method of manufacture are described in U.S. Pat. No. 3,854,516 to Burnell; U.S. Pat. No. 4,060,578 to Kisbany; U.S. Pat. No. 3,872,201 to Paul; and U.S. Pat. No. 4,416,844 to Wyman.

A number of problems are encountered in the fabrication of polyurethane filled tires. First, it is essential that the tire be completely filled with the polyurethane material and such material permitted to expand against the inner wall of the tire in tight abutment thereagainst. Such expansion must be closely controlled in the fabrication process to provide the proper ride characteristics and at the same time assuring that the core and the inner wall of the tire tightly grip each other so that there is no slippage therebetween or dead air space which could produce flat spots in the tire. Even though the tire body may appear to be fully filled during the fabrication process, subsequent shrinkage occurs which could result in a loose fit between the core and the tire body in the finished product. A second problem which has been encountered is that air pockets often form at one location or another between the core and the inner wall of the tire. Such air pockets can severely deprecate the riding qualities of the tire and must be eliminated.

The problem of air pockets is recognized in U.S. Pat. No. 4,416,844 to Wyman and U.S. Pat. No. 3,854,516 to Burnell. In Wyman, in an attempt to obviate this problem, water is mixed with the polyurethane forming materials to produce carbon dioxide which it is claimed dissolves in the elastomer to provide a substantially void free material. In the method described in U.S. Pat. No. 3,854,516 to Burnell a vent is provided in the wheel hub to allow air to escape. It is to be noted, however, that this vent is near the low gravity point of the tire during filling as compared to venting at the high point thereof in the present invention. Further, this vent is located only at a single point on the tire and cannot adequately accommodate air pockets which might form at other points around the tire circumference.

The method of the present invention provides an improved method for fabricating a tire having a solid polyurethane microcellular foam core wherein the core is in tight gripping abutment against the inner wall of the tire and the formation of air pockets or voids between the core and the tire body is substantially eliminated. This end result is achieved in the method of the present invention first by providing a plurality of small vent holes running in a circle around a high point in the outer surface of the tire wall, these vent holes permitting the escape of any air or gas which might form anywhere around the circumference of the tire. Secondly, the tight abutment of the core against the inner wall of the tire is assured by filling the tire with the polyurethane forming material until, with expansion resulting from the chemical reaction, the space between the jig simulating the wheel hub on which the tire is to be mounted and the wall of the tire is completely filled with such material. Then in a predetermined time after the tire has so been filled and while the polyurethane foam is still expanding, the jig simulating the tire hub is removed from the tire to free the core so that it can expand fully both outwardly and towards the center so as to press tightly against the inner wall of the tire so that even with subsequent shrinkage while curing the core will still remain in such a tight fitting condition against the tire casing when subsequently properly mounted on a wheel hub and will fit tightly against such hub.

It is therefore an object of this invention to provide an improved method for fabricating a solid tire having a microcellular polyurethane foam core.

It is still a further object of this invention to provide a simple yet highly effective method for fabricating a solid tire having a polyurethane foam core wherein the formation of air pockets within the tire is substantially eliminated.

It is still a further object of this invention to provide a method for fabricating a solid tire having a microcellular polyurethane foam core wherein such core is consistently formed so that it tightly grips the inner wall of the tire body when properly mounted.

It is another object of the invention to provide a solid tire having improved ride characteristics which is of light weight construction.

Other objects of the invention will become apparent as the description proceeds in connection with the accompanying drawings of which:

FIG. 1 illustrates a jig simulating a tire hub which is employed in the method of the invention;

FIGS. 2A and 2B illustrate the opposite sides of the tire with the jig attached thereto;

FIGS. 3, 3A and 3B illustrate the formation of vent holes in a circle running around the tire body;

Figure 3B:
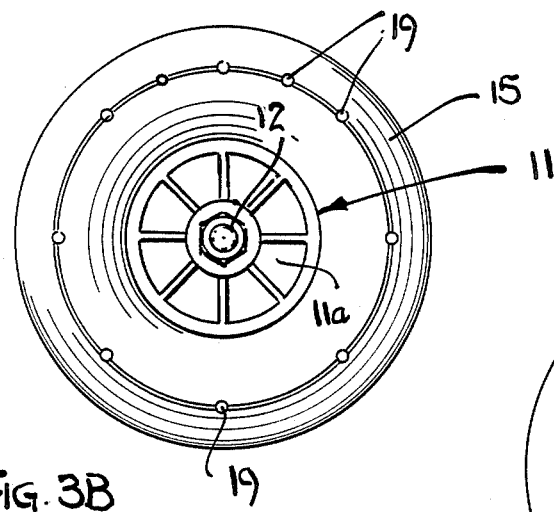

The method of the invention is carried out as follows. The tires as they are initially bundled and in a flattened condition must be opened and allowed to fully expand to their normal size. Referring to FIG. 1, jig 11 has two similar halves, 11a and 11b which are joined together by means of a bolt 12 and a nut 13 with a washer 14 being placed under nut 13 and a washer 16 under bolt 12. Bolt 12 has a diameter equal to that of the jig hole 10 so as to fit therein without any play. Jig 11 must fully simulate the wheel on which the tire is to be mounted, being an exact duplicate of the wheel hub. A release agent which may comprise a high grade industrial silicon is painted or sprayed on the inner surfaces of the wheel half sections 11a and 11b to assure release of the urethane material therefrom when the wheel hub is later removed.

The two halves 11a and 11b of jig 11 are then assembled to tire 15 as shown in FIGS. 2A and 2B. The jig must be precisely centered on the tire with the axle hole through which bolt 12 fits at the geometric center of the tire. Jig 11 is tightly clamped to the tire by means of bolt 12 and nut 13 with the inner surfaces 11c and 11d of the jig halves in flush abutment against each other and with the rims of the jig halves in tight abutment against the surfaces of the tire. A fill hole 11e is provided in the side wall of jig half 11a for use in filling the tire with foam material.

A circular drill guide 17 is then centered on the tire over bolt 12 and used to drill a plurality of vent holes 19 in the tire wall as shown in FIGS. 3, 3A and 3B. These holes are formed in a circle running around the highest point on the tire wall. The holes 19 are evenly spaced except for the region directly opposite the fill hole 11e where two extra holes are provided. Typically these holes are between 1/16th of an inch and ⅛th of an inch in diameter, the critical factor being to make the holes large enough so that the air will always escape as the foam rises but small enough so that the foam as it rises will seal the holes and not shoot out therethrough.

Figure 4:
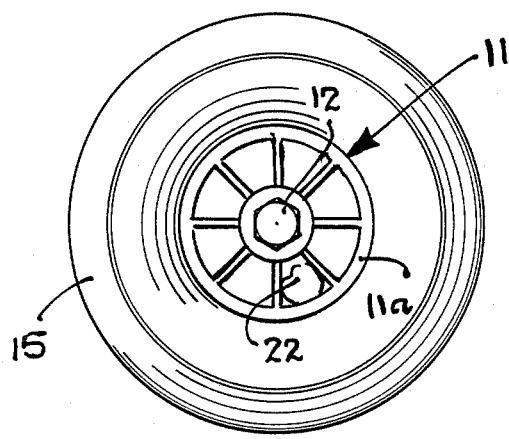
FIG. 4 illustrates the filling of the tire with the core material.
Figure 4A:
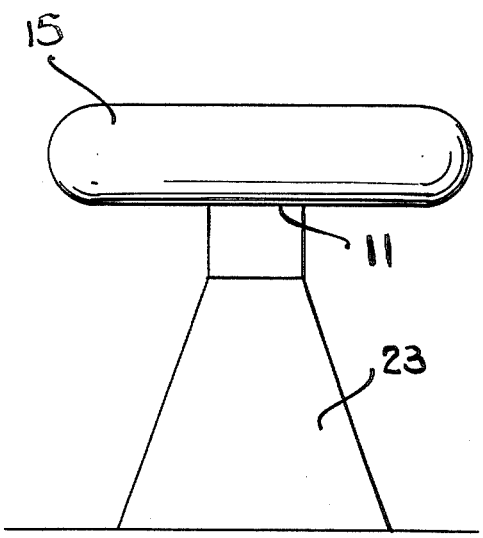
FIG. 4A illustrates a tire mounted on a stand for filling with core material.

The liquid foam forming material is then injected through fill hole 11e into the tire. The material employed to form the polyurethane foam comprises two components, polyol and isocyanae which are mixed together as they are injected into the tire. Typically, an injection pressure of 70 PSI with a flow rate of 100 grams per second are employed with the polyol being at a temperature of 100° F. and the isocyanate being at a temperature of 120° F. Typically, the mixture is composed of 60% isocyanate and 40% polyol but a 50—50 mixture may also be used. Injection pressure may be varied between 25 PSI and 200 PSI. Further, the temperature of the polyol can be between 70° and 130° F. while the isocyanate can be between 90° and 130° F., the lower temperatures giving slower initial reaction time. Further, the flow rate can be varied between 50 and 300 grams per second, it being important only that enough time be allowed for the material to enter the tire and seek its own level so that it is evenly distributed within the tire before the chemical reaction commences. The filling of the tire is terminated after a predetermined amount of material 22 has been placed in the tire after which the polyurthane foam formed from the mixture expands and starts to exit the fill hole as shown in FIG. 4, indicating that expansion is occuring, at which time the fill hole is plugged. While the tire is being filled, the wheel hub 11 must be supported on a stand 23 as shown in FIG. 4A so that the weight of the tire is fully supported on the hub. This is to avoid any tendency of the tire to push away from the rim which might result in liquid material running out the bottom which could result in an underfilled tire.

After filling, the jig is opened while the material is still expanding. Depending upon the size of the tire, this can be 5-9 minutes after filling. This is critical as it has been found that if the jig is opened early the core will be too large and will overexpand so that the wheel will not properly fit with full curing or the cellular structure of the material will have large cells, and the core will initially overexpand and then shrink when cured, resulting in a poor fit between the core and tire. If the mold is opened too late, the material will have taken a "set" and will be too small, there being a poor fit and dead air space between the core and the tire and the wheel.

Figure 5:
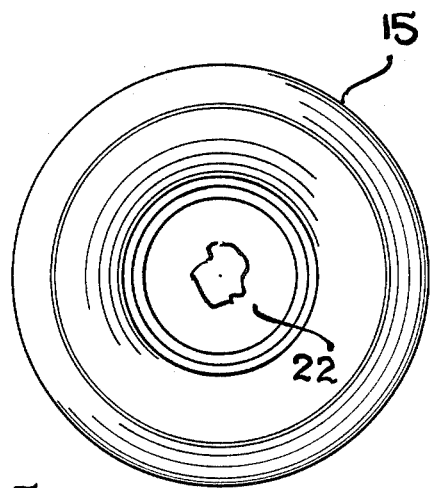
FIG. 5 illustrates the tire with the core formed therein after the tire has been removed from the jig.

When the jig is removed from the tire, it will readily separate from the polyurethane foam by virtue of the release agent applied thereto. A thin film of urethane foam "flash" material 22 as shown in FIG. 5 will remain, this being readily removable from the tire.

The following are examples of the use of the method of the invention for various size tires.

EXAMPLE I

An 8×2 tire which was in fully expanded condition was employed. The jig 11, the inner halves of which were coated with a silicon release agent, were tightly attached to the tire in a centered position thereon by means of bolt 12 and nut 13. Utilizing a drill guide 17, a shown in FIG. 3, eight 1/16th inch vent holes 19 were drilled in a circle running around the high point of the tire, these holes being evenly spaced except for those directly opposite the fill hole 11e whereat the holes were half spaced as shown in FIG. 3A. The tire was then placed with the wheel hub on a support stand 23 in a horizontal level position as shown in FIG. 4A and filled with a mixture of 60% isocyanate and 40% polyol at a pressure of 70 PSI and a flow rate of 100 grams per second with the polyol being at a temperature of 100° F. and the isocyanate being at a temperature of 120°. The fill time was 2.7 seconds at the end of which period the fill hole was plugged. The jig was removed from the tire after 6 minutes.

EXAMPLE II

A 280/250-4 tire in fully expanded condition was utilized. As for example 1, the inner surfaces of hub halves were coated with a silicon release agent and the hub 11 was clamped to the tire. Ten 7/64 inch vent holes were then drilled in a circle along the high point of the tire, these holes being equally spaced except for those opposite the fill hole, as shown in FIG. 3B, these oppositely positioned holes being half spaced. The tire was then placed on a stand 23 as shown in FIG. 4A in a horizontal level position and filled through the fill hole 11e with a 50—50 mixture of polyol and isocyanate, the isocyanate being at a temperature of 120° F. with the polyol being at a temperature of 100° F. The injection pressure was 70 PSI and the flow rate was 100 grams/sec. Filling was continued for a period fo 4.7 seconds at the end of which time the fill hole was plugged. Eight minutes after the tire had been filled, the jig 11 was removed therefrom.

While the invention has been described and illustrated in detail, it is to be clearly understood that this is intended by way of illustration and example only and is not to be taken by way of limitation, the spirit and scope of the invention being limited only by the terms of the following claims:

I claim:

1. A method for fabricating a solid tire having a tire casing filled with a microcellular polyurethane foam forming a core comprising the steps of:

installing a jig on the tire casing, said jig simulating the wheel hub with which the tire is to be used, said jig having two similar halves which are placed on opposite sides of the casing flush against each other and against the opposite outer surfaces of said casing, said jig being centered on the casing, the halves thereof being clamped flush against each other and in tight abutment against the opposite outer surfaces of the casing, said jig having a fill hole in one of the halves thereof which provides fluid communications between the interior of the casing and the exterior of the jig, forming a plurality of vent holes in a circle along the high point on the outer casing wall against which said one of the halves of said jib abuts, supporting the tire in a substantially horizontal position with the vent holes facing upwardly, filling said casing through said fill hole with an amount of a liquid flexible microcellular polyurethane foam forming mixture composed of polyol and isocyanate such that said polyurethane foam, expanding in response to the chemical reaction of the mixture of said polyol and isocyanate, will completely fill said casing, plugging said fill hole to contain the polyurethane foam within the casing, and removing said jig from said casing a predetermined time period after the casing has been filled, while the polyurethane foam is still expanding, such that the polyurethane foam expands both towards the center of the casing and outwardly tightly against the casing so that it any remaining air is vented out through the vent holes to avoid the formation of air pockets in the casing.

2. The method of claim 1 wherein the mixture is a 50%—50% one.

3. The method of claim 1 wherein the mixture is 60% isocyanate and 40% polyol.

4. The method of claim 1 wherein the mixture is between 60%–50% isocyanate and 40%–50% polyol.

5. The method of claim 1 wherein while the casing is being filled with said mixture it is supported in a substantially horizontal position on the other of the halves of the jig.

6. The method of claim 1 wherein the vent holes include a first group of said vent holes which are equally spaced around the circle and a second group of said vent holes located on the side of said casing diametrically opposite to that on which the fill hole is located which are spaced half way between the holes of said first group.

7. The method of claim 1 wherein said tire casing is an $8 \times 2$ size and there are 8–9 vent holes.

8. The method of claim 1 wherein said tire casing is a 280/250-4 size and there are 10–11 vent holes.

9. The method of claim 1 wherein the jig is removed from the casing in 5–9 minutes after the casing is filled.

10. The method of claim 1 wherein the vent holes are 1/16" to 7/64" in diameter.

11. The method of claim 1 wherein the vent holes are large enought to permit air to escape and small enough to avoid the foam running out the holes as the foam expands.

12. The method of claim 8 wherein the casing is filled with the polyurethane forming mixture for approximately 4.7 seconds at a rate of 100 grams/sec. and the jig is removed from the casing approximately eight minutes after the tire has been filled.

13. The method of claim 7 wherein the casing is filled with the polyurethane forming mixture for approximately 2.7 seconds at a rate of 100 grams/sec. and the jig is removed from the casing approximately six minutes after the tire has been filled.

* * * * *